Aug. 21, 1923.

C. W. LARNER

VALVE

Filed May 2, 1919 2 Sheets—Sheet 1

1,465,916

WITNESS:
Robt R Kitchel

INVENTOR
Chester W. Larner
BY
Augustus B Stoughton
ATTORNEY.

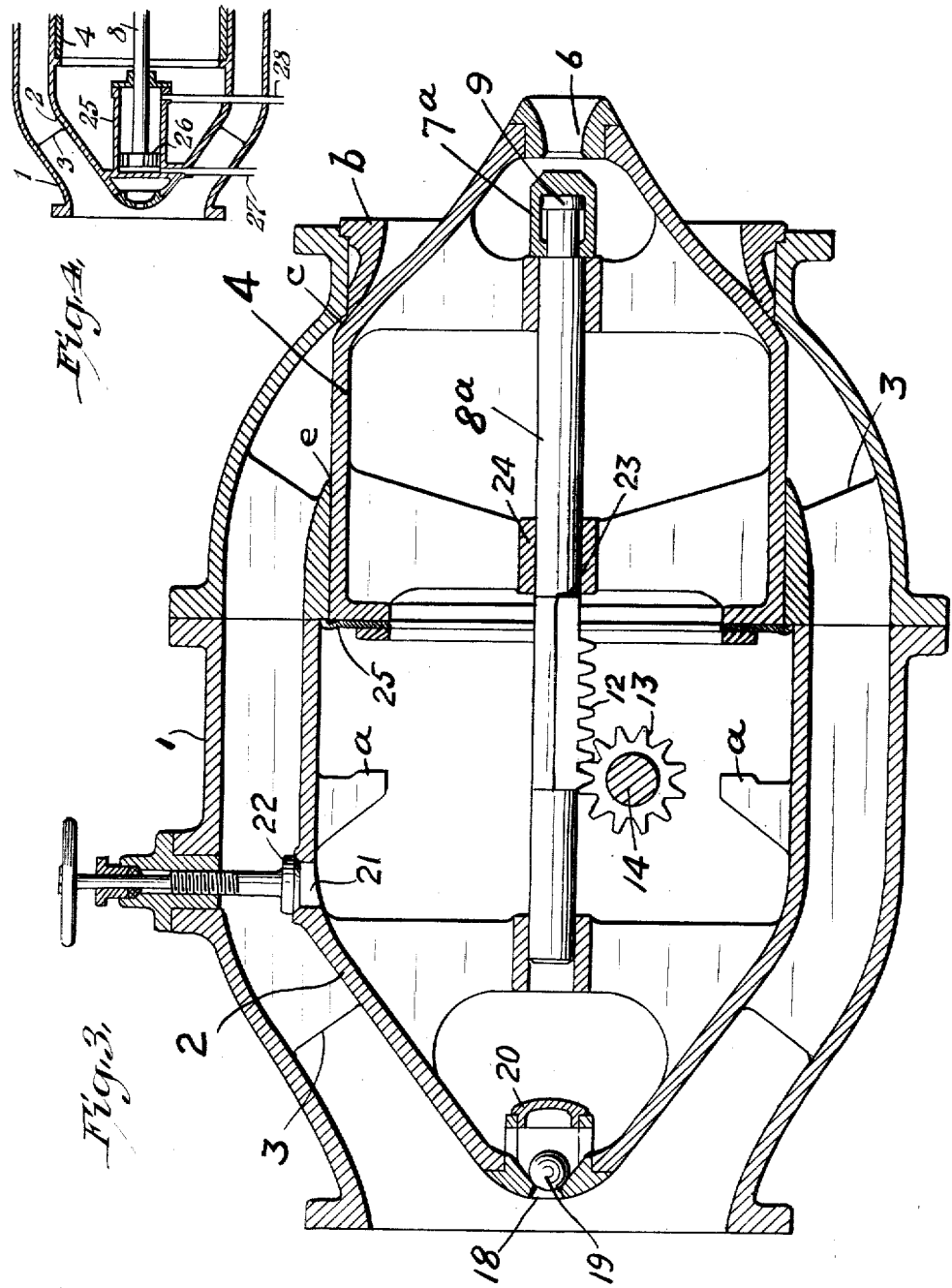

Patented Aug. 21, 1923.

1,465,916

UNITED STATES PATENT OFFICE.

CHESTER W. LARNER, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

VALVE.

Application filed May 2, 1919. Serial No. 294,155.

*To all whom it may concern:*

Be it known that I, CHESTER W. LARNER, a citizen of the United States, residing at Philadelphia, in the county of Philadelphia and State of Pennsylvania, have invented certain new and useful Improvements in Valves, of which the following is a specification.

This invention relates to valves for pipe lines or conduits and particularly to valves immersed in the fluid in the conduit and subjected to the pressure thereof. In such structures when the conduit is empty or the fluid in it still with no tendency to flow there is little resistance to the operation of the valve and at such times a comparatively light force is sufficient to open or close the valve. When the fluid in the conduit is flowing or stopped from flowing only by the valve, great pressures may be developed making it difficult to properly operate the valve.

One object of this invention is to provide an opening and closing means for such a valve which will be easily operated by hand or mechanical power when the conduit is empty or the fluid is without tendency to flow, and which will automatically utilize the fluid pressure in the conduit to move the valve as desired when the conditions of flow would otherwise render it difficult to operate the parts by hand or mechanical power. Another object is to provide a simple and durable construction. Still another object is to provide a valve which may be used for throttling the flow through the valve as in the case of outlets from dams or pressure conduits where the inlet end of the valve is under the full pressure of the reservoir or conduit and the outlet end is under reduced or atmospheric pressure, causing relatively high velocity of the water through the valve. Ordinary valves such as gate or slide valves are very difficult to open or close under such conditions, particularly if the pressures are high, and they are subject to serious vibration and erosion due to the fact that the water is discharged not in a smooth jet but in a violently disturbed condition. The valve herein described is of the needle type, discharging a smooth jet at all openings and the plunger if desired may be held at any position or opening by the automatic balancing of the fluid pressures exerted upon the plunger without the application of any mechanical force whatever to the plunger. These objects and advantages will appear from the following description.

In the drawings, Figure 1, is a longitudinal cross section through a valve showing one form of my invention.

Fig. 4 is a sectional view illustrating a modification.

Fig. 3, is a view similar to Fig. 1, showing a modification in which the valve is adapted for use in cases of flow in both directions.

Figure 1:
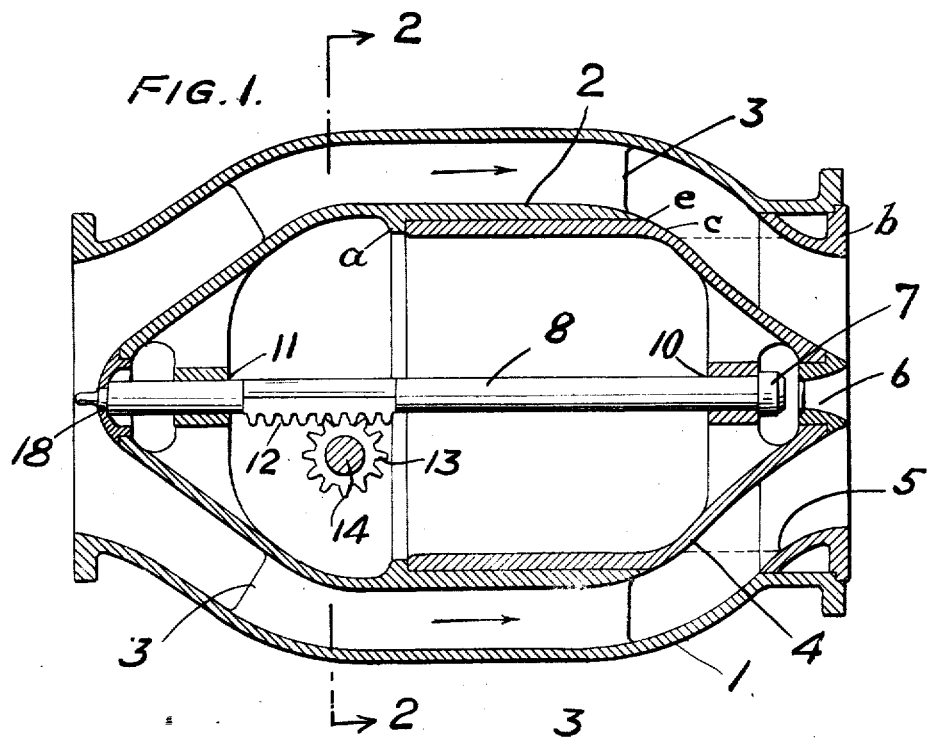
Figure 2:
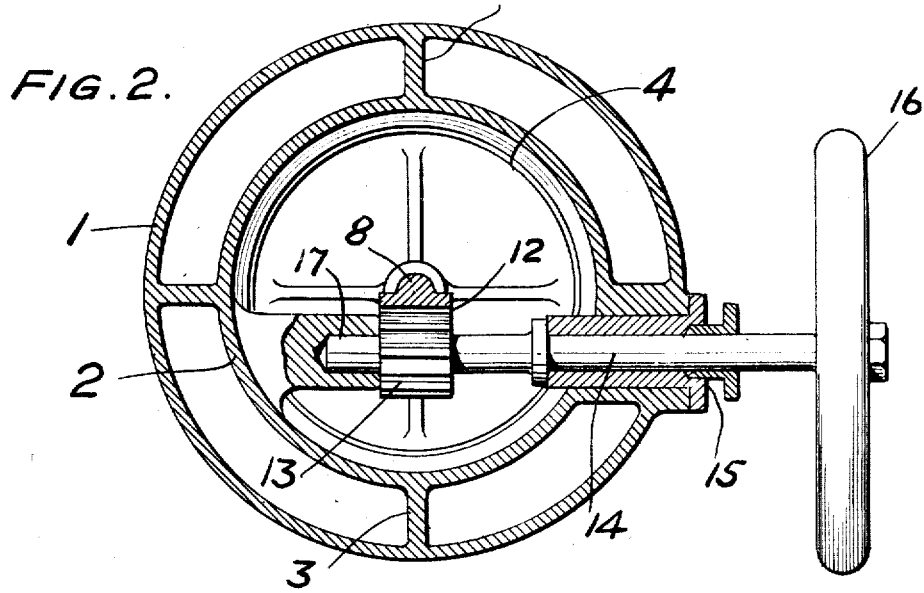
Fig. 2, is a transverse cross section on the line 2—2, of Fig. 1, looking towards the outlet end of the valve.

The valve conduit includes an enlarged body 1, and has an internal cylinder 2, with a conical head at one end, the cylinder 2, being connected to body 1, by radial ribs 3.

A moving element or plunger 4, slides in the internal cylinder 2, and its conical end formed with the usual reverse curves to substantially conform to the stream line flow of the water closes against the seat 5, at the outlet end of the valve, as indicated in dotted lines, said seat being of less diameter than the outside of plunger 4, for a purpose which will appear from the following description.

Plunger 4, is provided with an aperture 6, which is controlled by valve 7, mounted on the end of rod 8, movable for a short distance without moving the plunger 4, as shown. The valve 7, for purposes of identification will be referred to as a choke valve.

Rod 8, is guided at one end in a bearing 10, which is integral with plunger 4, being attached thereto by ribs, as shown. Rod 8, is guided at the other end by bearing 11, which is an integral part of internal cylinder 2. Rod 8, has gear teeth cut on it to form a rack 12, which engages a pinion 13, on shaft 14, which passes through stuffing box 15, in the valve body and is operated by hand wheel 16. By means of marks on the hand wheel, the position of plunger 4, is indicated to the operator. The inside end of shaft 14, has a bearing 17, on internal cylinder 2.

An aperture 18, is provided in internal cylinder 2, to admit line pressure inside of 2. This aperture is smaller than aperture 6, for reasons hereafter referred to. When plunger 4, is open, a prolongation of rod 8, projects through aperture 18, to keep it free of obstruction.

The functions of this mechanism will be best understood by considering separately the several conditions under which such a valve may be required to operate. These conditions are as follows, "normal flow" being understood to be from left to right in the drawings, and "reverse flow" from right to left.

To open or close the valve:

(a) With the conduit under pressure and flow in the normal direction.

(b) With the conduit under pressure and flow in the reverse direction.

(c) With the line under pressure and no flow.

(d) With the line empty.

It being understood in cases (a) and (b) that the term "flow," with the valve closed, means simply tendency to flow, which results in motion of the fluid as soon as the valve is opened.

(a) With the valve closed under condition (a) valve 7, would be seated against aperture 6. The conduit beyond the plunger, being in this case cut off from the source of pressure supply, would be empty or in any event under lower pressure, usually atmosphere.

To open plunger 4, rod 8, is drawn backward by means of the rack and pinion. This unseats valve 7, permitting pressure inside plunger 4, to escape to the region of lower pressure through aperture 6. Plunger 4, will then follow the motion of rod 8, as a result of the higher pressure on the nose of the plunger and the reaction of the flowing water on the curved surface of the nose. In this manner the plunger is opened at a rate which cannot exceed the movement of the hand gear by the operator because, if for any reason the plunger tends to travel faster, valve 7, will tend to re-seat itself on aperture 6, thus building up the pressure inside the plunger and checking its motion. Pressure is admitted at all times through aperture 18, but since this aperture is considerably smaller than 6, this constant admission of pressure does not interfere materially with the reduction of pressure through aperture 6. If the pressure on the nose of the plunger is not enough greater than the pressure inside the plunger to move the plunger hydraulically, rod 8, will move it mechanically by valve 7, striking against bearing 10.

When the plunger is open under condition (a), the operating mechanism will be in the position shown in Figure 1. The plunger will then be closed by racking rod 8, forward until valve 7, approaches aperture 6, when, if there is any considerable flow through the valve, pressure inside the plunger will build up sufficiently to move the plunger and if, due to low velocity of flow, this does not occur the plunger will be moved mechanically by valve 7, seating against plunger.

(b) Valve shown in Figure 1, will not operate if the flow is reversed.

(c) With no flow in the conduit the plunger will be opened mechanically by valve 7, striking against bearing 10, and closed mechanically by valve 7, striking against the inside of the end of the plunger.

(d) With the conduit empty the plunger will be opened and closed in the same manner as under condition (c).

It will be apparent from the foregoing description that, at no time, is the hand mechanism called upon to exert any more force than that required to seat or unseat valve 7 and if there is no flow to overcome the friction of plunger 4, in cylinder 2. The force exerted on plunger 4, due to any condition of unbalanced pressure can never be transmitted to the hand mechanism because under all conditions the motion of plunger 4, in relation to valve 7, will immediately counteract any tendency of plunger 4, to move faster than rod 8. For example, if plunger 4, is opened by opening valve 7, and tends to move faster than valve 7, this motion in itself will tend to reseat valve 7, thus automatically checking the motion of plunger 4. Conversely, if plunger 4, is closed by closing valve 7, and tends to move faster than valve 7, this motion of plunger 4, will immediately unseat valve 7, thus tending to check the motion of plunger 4. Valve 7, is so designed that it will open sufficiently to secure the maximum possible flow through aperture 6, before it strikes against the bearing 10.

The automatic function of valve 7 is to balance the fluid forces inside and outside of plunger 4 and thus keep plunger 4 in a state of equilibrium. It is this automatic function which makes plunger 4 follow valve 7 and which holds plunger 4 stationary in any partly open position if valve 7 is held stationary. No matter what motion is imparted to valve 7 plunger 4 will inevitably follow until it reaches a position where the opposing fluid forces are again in equilibrium and there it will stop and remain until further motion is imparted to valve 7. When there is flow in the conduit, valve 7 never actually touches either bearing 10 or aperture 6 except when plunger 4 is in open and closed positions respectively. The coordinated motion of plunger 4 and valve 7 does not occur when there is no flow in the conduit as, for example, in the case where the conduit is closed beyond the outlet from the valve, because this coordinated motion depends upon having, around the extremity of aperture 6, a region of pressure relatively lower than the pressure of the fluid way which is communicated to the internal chamber through port 18 or through the clearance space around plunger 4. This region of lower pressure depends upon the velocity and direction of flow across the nose of plunger 4 and aperture 6, the action of the flow surrounding aperture 6 upon the flow through aperture 6 being similar to that of an ejector and tending to draw down the pressure in the internal chamber. It is obvious therefore that the shape of the plunger nose is vitally important in its effect upon the efficiency of aperture 6. If, for example, the nose of the plunger were made flat or blunt instead of conical so that the fluid, instead of being deflected by the pointed nose and turned into an axial direction, were allowed to flow across the plunger nose, so that the streams from opposite sides of the valve impinged upon each other, a back-pressure would be built up on aperture 6 which would prevent the reduction of pressure in the internal chamber which would otherwise result when aperture 6 is opened by valve 7. In this case plunger 4 could be unseated, but the balance of the stroke would have to be accomplished by mechanical force because there would be no region of lower pressure into which aperture 6 would discharge. The maximum efficiency of aperture 6 is obtained by prolonging the nose of the plunger until it extends as far as the point of maximum contraction of the flowing stream as it leaves the outlet end of the valve. This point can readily be determined if the valve is permitted to discharge into the atmosphere. It is also important to observe that the pointed plunger nose, necessary to the proper functioning of the valve 7, and aperture 6, is also most favorable in other important respects. It increases the dynamic reaction against the plunger and assists the opening of the plunger, reduces the hydraulic losses in the valve and produces a smooth discharging jet when the valve is used as a regulating nozzle on the end of a pipe line.

The hand wheel and gearing shown merely illustrate one way of operating rod 8, but it is not desired to limit the invention in that respect. The necessary power may be provided by electric motor, for example, or by a cylinder 25 with a piston 26 on rod 8, operated by exhausting pressure from one end and admitting line pressure to the other as by 27 and 28. Some means other than hand power would be required in the case of large valves with heavy plungers and also if remote control is used.

Figure 3, shows a longitudinal cross section through a valve with certain modifications intended to provide for operation with the flow reversed.

Valve $7^a$, instead of being integral with rod $8^a$, is separate and movable on rod $8^a$, the motion provided being sufficient to permit valve $7^a$, to seat on aperture 6, with rod $8^a$, in the position shown on the drawing.

Plunger 4, is provided with a flexible annular packing disc 25, which seats against a shoulder in internal cylinder 2, when the plunger is closed thus preventing leakage from the inside of the internal cylinder to the water way in the valve body when the flow is lefthanded in the drawings.

Aperture 18, is provided with a ball check 19, in a cage 20, to prevent flow from the internal cylinder into the valve body.

An additional aperture 21, controlled by a valve disc 22, operated in the usual manner by means of a screw and hand wheel, is provided in order to exhaust pressure from inside of internal cylinder 2, to the valve body when desired. Aperture 21, is larger than aperture 6, for reasons hereafter referred to. In all other respects the construction is the same as shown in Figure 1, and for flow righthanded in the drawings the operation is the same.

The conditions of operation are as follows, having reference to the four cases $(a)$, $(b)$, $(c)$ and $(d)$ previously enumerated:

$(a)$ With the valve closed under condition $(a)$ shoulder 23, on rod $8^a$, abuts against bearing 24, in plunger 4, and valve $7^a$, is seated on aperture 6, due to higher pressure inside of plunger 4. which is connected thereto through aperture 18, ball check 19, being open.

In order to open plunger 4, rod $8^a$, is racked back until valve $7^a$, is pulled open by collar 9, on rod $8^a$, pressure inside plunger 4, is then discharged through aperture 6, in spite of the fact that it is at the same time entering through aperture 18, on account of the fact that aperture 6, is considerably larger than aperture 18.

In this manner plunger 4, follows rod $8^a$, until it is open when it is locked in that position by collar 9, holding valve $7^a$, against bearing 10.

To close plunger 4, under condition $(a)$, rod $8^a$, is racked forward permitting valve $7^a$, to approach its seat on aperture 6, thus confining inside of plunger 4. the line pressure which is admitted through aperture 18. The plunger moves forward due to the fact that the pressure inside the plunger is greater than that on its nose. Valve $7^a$, moves forward on rod $8^a$, until it strikes collar 9, due to the same unbalanced condition that moves plunger 4.

$(b)$ Under condition $(b)$ when plunger 4, is closed, the operating mechanism will be in the position shown by Fig. 3. Valve $7^a$, will be back against collar 9, admitting pressure through aperture 6, inside of plunger 4, and this pressure will be confined due to ball check 19, closing aperture 18, and packing 25, seated against the shoulder in internal cylinder 2. The plunger is held closed due to the fact that the area inside of internal cylinder 2, exposed to pressure, is greater than the area of the seat.

In order to open plunger 4, valve 22, is opened discharging pressure from inside of internal cylinder 2. This will drop the pressure inside of plunger 4, in spite of the fact that it is entering through aperture 6, because aperture 21, is considerably larger than aperture 6. The rate at which plunger 4, opens may be controlled by the opening of valve 22, and the opening of plunger 4, is thus accomplished without recourse to the hand mechanism unless the velocity through the valve is so slow that the pressure exerted on the nose is not sufficient to open the plunger in which case the opening stroke may be assisted by the hand gear.

In order to close the plunger under condition ($b$) valve 22, must be closed and if there is any appreciable velocity of flow through the valve, plunger 4, will close itself as fast as rod $8^a$, is racked forward due to the impingement of flow on aperture 6, thus causing higher pressure inside the plunger than outside.

($c$) and ($d$) Under conditions ($c$) and ($d$) the plunger must be operated mechanically. It is opened by collar 9, striking against valve $7^a$, and the latter against bearing 10, and is closed by shoulder 23, striking against bearing 24.

While those skilled in the art will understand the matter, it may be remarked that in the operation of the valve when there is sufficient flow from left to right in the drawings, the opening 18, is exposed to pressure that may be compared to the pressure head plus the velocity head and the opening 6, is exposed to pressure that may be compared to the pressure head minus the velocity head and by choking the opening 6, more or less with the valve 7, or $7^a$, this difference in pressure can be availed of to move the plunger element. To close the plunger element the opening 6, is choked or closed and pressure allowed to build up inside the plunger valve. To open the plunger element the choke valve is opened releasing pressure inside the plunger element which opens under pressure on the outside of its nose, acting at first on an annular area $c$, and as the plunger opens, on the entire nose.

$a$, are stops between which and the seat the plunger element moves with a regulated movement. Referring to Fig. 1, the contracted portion $b$, of the casing consists of a detachable ring provided with a flange corresponding to a flange on the reduced end of the casing, and it can be removed for the insertion of the plunger element so that the casing can be made circumferentially in one piece. The opening 18, may be omitted and pressure supplied inside the fixed element by leakage at $e$, through the clearance space.

By the apparatus of this invention the auxiliary moving forces applied by the conduit pressures and the rate of movement of the valve are always under complete control and the position of the operating means indicates the position of the valve. In the construction shown there is no spill or discharge of fluid outside of the main and this is particularly advantageous in handling fluids which it is undesirable to waste or discharge. Moreover the form of mechanical connection shown is such as to require minimum attention, and being reversible within the hollow valve, i. e., transmitting power substantially equally from one element to the other in either direction, the operation of the valve, either mechanically or hydraulically is permitted. The turning effort of shaft 14, received for instance from hand wheel 16, is converted from rotary to linear movement by direct engagement of the shaft pinion 14 with the rack 12 of the rod 8 and without any intermediate complications, and it is substantially as easy for the movement of the plunger to turn the shaft as it is for the turning of the shaft to move the plunger; and in case the plunger becomes abnormally unbalanced and tends to move either open or closed in spite of the fluid pressure control, it will move and correspondingly rotate the shaft 14, unless the shaft 14 is connected to mechanism outside of the conduit to prevent this movement. The control mechanism in the conduit transmits to the outside of the conduit the pressure exerted on it by the movement of the valve plunger and where, as in the valves shown, the outer end of the shaft 14 is left free to turn it will do so and permit the valve plunger to move open or closed or to some intermediate balanced position.

I claim.

1. A valve comprising a casing, an internal fixed hollow cylindrical element spaced from the conduit to form a fluid way, and having a closed end provided with a relatively small opening, a movable plunger element co-operating with the fixed cylindrical element and having a conical end of which a part is exposed to pressure in the fluid way in closed position and which is provided with a relatively large opening, a seat and a stop for the plunger element, a rod arranged in and movable in respect to both elements and having lost-motion-mechanical-connection with the plunger element and provided with a choke valve co-operating with the opening in the plunger element, and controlling means for shifting the rod to cause said choke valve to adjust said plunger opening so as to unbalance the fluid pressure outside and inside the plunger element and thereby cause it to move between its seat and stop with a co-ordinated and controlled motion.

2. A valve comprising the combination of a conduit having a fluid way, an internal fixed hollow cylindrical element spaced from the conduit and having one closed end, a movable plunger element co-operating with the cylindrical element and forming therewith an internal chamber having an opening communicating with the fluid way, an opening through the plunger element, a stop and seat for the plunger, said seat being of less diameter than the plunger, a check valve for the opening of the internal chamber, a valve for the opening in the plunger element, a rod having lost-motion-mechanical-connection with the last named valve and with the plunger, and means for shifting the rod.

3. In a valve the combination of a conduit having a plunger seat and a cylinder providing a water way, a plunger subjected internally and externally to fluid way pressure and having differential pressure areas such that unbalancing of pressure thereon unseats and operates the plunger for full and partial strokes solely by pressure, and means including a passage provided in the nose of the plunger for unbalancing the pressure on said areas to unseat and operate the plunger for full and partial strokes solely by pressure, substantially as described.

4. In a valve the combination of a conduit having a plunger seat and a cylinder providing a fluid way, a plunger having a passage connecting its interior to a point of low pressure in the fluid way and subjected internally and externally to fluid way pressure and having differential pressure areas such that as the passage is opened the plunger is pressure unseated and as the passage is closed the plunger is pressure seated, and a choke-valve and operative to open and to close and to regulate the passage to unseat and operate the plunger for full and partial strokes solely by pressure, substantially as described.

5. In a valve the combination of a conduit having a plunger seat and a cylinder providing a water way, a plunger subjected internally and externally to fluid way pressure and having differential pressure areas such that unbalancing of pressure thereon unseats and operates the plunger for full and partial strokes solely by pressure, a stem provided with a choke valve co-operating with a passage provided from the interior of the plunger to the fluid way to unbalance said pressure for unseating and complete operation of the plunger, and a stand-by lost motion connection between the stem and plunger of sufficient range to permit of the described pressure operation of the plunger and to be effective to move the valve upon failure of pressure, substantially as described.

6. A valve comprising the combination of a conduit having a fluid way and a plunger element seat, an internal fixed hollow cylindrical element spaced from the conduit, a movable hollow plunger element co-operating with the cylindrical element and forming therewith an internal chamber, the diametrical relation of the seat and plunger being such that the plunger is unseated by pressure in the fluid way upon discharge of pressure from the internal chamber, a passage between said internal chamber and a point of low pressure in said fluid way, a choke valve for the passage, and means for shifting said choke valve to unseat and move said plunger element by fluid pressure in the fluid way, substantially as described.

7. A valve comprising the combination of a conduit having a fluid way and a seat, an internal fixed hollow cylindrical element spaced from the conduit and having one closed end, a movable hollow plunger element co-operating with the cylindrical element and forming therewith an internal chamber, the diametrical relation of the seat and plunger being such that the plunger is unseated by pressure in the fluid way upon discharge or pressure from the internal chamber, a passage between said internal chamber and a point of low pressure in said fluid way, and controlling means for regulating said passage whereby the fluid pressure in said internal chamber is automatically adjusted to balance the external pressure on the end of said plunger element and hold the latter in equilibrium at any desired position, substantially as described.

8. A valve comprising a conduit having a fluid way, an internal fixed hollow cylindrical element spaced from the conduit and having a closed end provided with an opening, a movable hollow plunger element co-operating with the fixed cylindrical element and having a passage between the interior of the plunger and the fluid way, a seat and a stop for the plunger element, the seat being of less diameter than the plunger, a rod arranged in and movable in respect to both elements and having lost-motion-mechanical - connection with the plunger element and provided with a choke valve co-operating with the opening in the plunger element, and controlling means for shifting the rod to cause said choke valve to adjust the plunger opening so as to unbalance the fluid pressure outside and inside the plunger element and thereby cause it to move between its seat and stop with a co-ordinated and controlled motion by fluid pressure alone.

9. In combination, a fluid conduit, a valve seat therein, a hollow valve within said conduit comprising two telescoping parts one of which is fixed in the conduit and the movable section of which is formed with stream line surfaces, mechanical means for moving said movable section, hydraulic means for moving said section comprising a passage from the interior of the valve to a point of low pressure in the conduit, and means for controlling said passage whereby the fluid pressures may be unbalanced on the movable section to move the same without the application of mechanical force.

10. In combination, a fluid conduit, a valve seat therein, a hollow valve within said conduit comprising two telescoping parts one of which is fixed in the conduit and the movable section of which is formed with stream line surfaces, mechanical means for moving said movable section, and hydraulic means for moving said section comprising a passage from the interior of the valve to a point of low pressure in the conduit and means for controlling said passage whereby the fluid pressures may be unbalanced on the movable section to move the same without the application of mechanical force, said mechanical movable means being adapted to supplement the hydraulic means whenever the available fluid pressure is insufficient.

11. In a valve having hollow fixed and plunger elements with a fluid way around them and in which the plunger is operatable in two directions by fluid pressure and in combination therewith, means arranged within the elements for establishing a regulatable fluid opening through each element to the fluid way, to unseat and move the plunger at any desired rate of travel or to hold it stationary in any desired position by fluid pressure, substantially as described.

12. In a valve provided with hollow fixed and plunger elements having an interior chamber therebetween and a fluid way around them in which fluid pressure is available to unseat the plunger element, and in combination therewith, a passage communicating between the fluid way and said chamber, and a valved opening through the plunger element, to regulate the fluid pressure in the interior chamber to unseat and move the plunger with fluid-pressure-controlled motion or to hold it stationary in any position by fluid pressure, substantially as described.

13. In a valve the combination of a conduit having an inlet and an outlet and a fluid way between them, a chamber arranged in and spaced from the conduit and adapted to provide a region of relatively high pressure at the casing inlet and in the fluid way, and a region of relatively low pressure at the casing outlet, said chamber comprising hollow fixed and movable elements co-operating together, the interior of said chamber being in communication with the region of high pressure, a seat for the movable element to close the valve, an opening provided between the movable element and the region of low pressure, and means for regulating said last named opening to seat and unseat the movable element with fluid-pressure-controlled movement, substantially as described.

14. In combination, a fluid conduit, a valve seat therein, a hollow valve within said conduit, comprising two telescoping parts, one of which is fixed in the conduit and the movable section of which is formed with stream line surfaces and adapted to seat upon the valve seat, and mechanical means for moving the movable section from the outside of the valve, that portion of said means within the hollow valve being reversible so as to transmit to the outside mechanism a force exerted by unbalanced hydraulic pressures moving the movable section of the valve.

15. In combination, a fluid conduit, a valve seat therein, a hollow valve within said conduit, comprising two telescoping parts, one of which is fixed in the conduit and the movable section of which is formed with stream line surfaces and adapted to seat upon the valve seat, a rack connected to said movable section of said valve, a pinion engaging said rack and a shaft driving said pinion and extending to the outside of the conduit, said rack and pinion mechanism being reversible so as to transmit to the outside of the conduit a force exerted by hydraulic pressures moving the movable section of the valve.

16. In combination, a fluid conduit, a valve seat therein, a hollow valve within said conduit, comprising two telescoping parts, one of which is fixed in the conduit and the movable section of which is formed with stream line surfaces and adapted to seat upon the valve seat, a connecting passage between the opposite sides of the movable section, and mechanical means for moving the movable section from the outside of the valve, that portion of said means within the hollow valve being reversible so as to transmit to the outside mechanism a force exerted by unbalanced hydraulic pressures moving the movable section of the valve.

17. In combination, a fluid conduit, a valve seat therein, a hollow valve within said conduit, comprising two telescoping parts, one of which is fixed in the conduit and the movable section of which is formed with stream line surfaces and adapted to seat upon the valve seat, a connecting passage between the opposite sides of the movable section, a rack connected to said movable section of said valve, a pinion engaging said rack and a shaft driving said pinion and extending to the outside of the conduit, said rack and pinion mechanism being reversible so as to transmit to the outside of the conduit a force exerted by hydraulic pressures moving the movable section of the valve.

18. In combination, a fluid conduit, a valve seat therein, a hollow valve within said conduit, comprising two telescoping parts, one of which is fixed in the conduit and the movable section of which is formed with stream line surfaces and adapted to seat upon the valve seat, a connecting passage between the opposite sides of the movable section, mechanical means for moving the movable section from the outside of the valve, that portion of said means within the hollow valve being reversible so as to transmit to the outside mechanism a force exerted by unbalanced hydraulic pressures moving the movable section of the valve, and means for closing said connecting passage during the closing movement of the valve, and opening the same during the opening movement of the valve.

19. In combination, a fluid conduit, a valve seat therein, a hollow valve within said conduit, comprising two telescoping parts, one of which is fixed in the conduit and the movable section of which is formed with stream line surfaces and adapted to seat upon the valve seat, a connecting passage between the opposite sides of the movable section, mechanical means for moving the movable section from the outside of the valve, that portion of said means within the hollow valve being reversible, and means whereby an abnormal closure of the connecting passage will permit fluid pressure in the interior of the valve to move the movable section to closed position.

20. In combination, a fluid conduit, a valve seat therein, a hollow valve within said conduit, comprising two telescoping parts, one of which is fixed in the conduit and the movable section of which is formed with stream line surfaces and adapted to seat upon the valve seat, a connecting passage from the inside of said hollow valve to the conduit below the movable section of the valve, and mechanical means for moving said movable section of the valve comprising a bearing in the fixed portion of the valve, a rod slidably supported in said bearing at one end and connected to the movable section at the other end, a rack on said rod, a pinion engaging said rack, and means for rotating said pinion from outside of said conduit to move said rod and plunger, said rack and pinion means being movable in the reverse direction by movement of the movable section due to unbalanced hydraulic pressure acting thereon.

21. In combination, a fluid conduit, a valve seat therein, a hollow valve within said conduit, comprising two telescoping parts, one of which is fixed in the conduit and the movable section of which is formed with stream line surfaces and adapted to seat upon the valve seat, means for alternately unbalancing the hydraulic pressure of the conduit upon opposite sides of the movable section to move the same hydraulically, and mechanical means for moving the movable section from the outside of the valve, that portion of said means within the hollow valve being reversible, whereby the valve may be moved hydraulically or mechanically, or both.

22. In combination, a fluid conduit, a valve seat therein, a hollow valve within said conduit, comprising two telescoping parts, one of which is fixed in the conduit and the movable section of which is formed with stream line surfaces and adapted to seat upon the valve seat, a portion of the downstream area of said movable section extending outside of the valve seat and being always exposed to conduit pressure, a connecting passage between the opposite sides of the movable section, means for admitting pressure from the conduit to the interior of the valve in excess of the pressure on the downstream side of the movable section, and mechanical means for moving the movable section from the outside of the valve, that portion of said means within the hollow valve being reversible, whereby the valve may be moved hydraulically or mechanically, or both.

23. In combination, a fluid conduit, a valve seat therein, a hollow valve within said conduit, comprising two telescoping parts, one of which is fixed in the conduit and the movable section of which is formed with stream line surfaces and adapted to seat upon the valve seat, a portion of the downstream area of said movable section extending outside of the valve seat and being always exposed to conduit pressure, a connecting passage between the opposite sides of the movable section, means for admitting pressure from the conduit to the interior of the valve in excess of the pressure on the downstream side of the movable section, and mechanical means for moving the movable section from the outside of the valve, that portion of said means within the hollow valve being reversible, whereby the valve may be operated either hydraulically, or mechanically, or both.

CHESTER W. LARNER.